May 4, 1965 E. ASCOLI 3,182,126

ARRANGEMENT FOR PRODUCING ELECTRIC SIGNALS CONTROLLING THE TYPING OF TYPEWRITER SIGNS DEFINED BY COORDINATES

Filed July 17, 1961 5 Sheets-Sheet 1

INVENTOR

ENZO ASCOLI

By Emory L. Groff Jr.

Atty

INVENTOR
ENZO ASCOLI
BY Emery L. Groff Jr.
Atty

Fig. 8

| | | |
|---|---|---|
| 1 | 1 | 5 |
| 1 | 2 | 5-1 |
| | | |
| 2 | 2 | 4-13 |
| | | |
| 3 | 1 | 6 |
| 3 | 2 | 4-5 |
| | | |
| 4 | 2 | 2-5 |
| | | |
| 5 | 2 | 4-5 |
| | | |
| 6 | 2 | 3-4 |
| | | |
| 7 | 1 | 13 |
| 7 | 1 | 5 |
| | | |
| 8 | 1 | 7 |
| 8 | 1 | 3 |
| | | |
| 9 | 2 | 3-4 |
| | | |
| 0 | 1 | 3 |
| | | |

Fig. 11

| | | |
|---|---|---|
| ( | 1 | 4 |
| ) | 1 | 4 |
| • | 0 | - |
| , | 1 | 2 |
| : | 0 | - |
| ^ | 1 | 5 |
| ´ | 1 | 2 |
| ` | 1 | 2 |
| ! | 1 | 2 |
| & | 2 | 2-14 |
| ? | 2 | 4-13 |
| + | 2 | 1-2 |
| = | 1 | 1 |
| ç | 2 | 4-4 |
| § | 1 | 14 |
| // | 1 | 2 |
| ,, | 1 | 2 |
| •• | 0 | - |
| % | 2 | 2-3 |
| | | |
| | | |

INVENTOR
ENZO ASCOLI
BY Emory L. Groff Jr.
Atty

Fig. 9

| | | |
|---|---|---|
| a | 2 | 3-5 |
| a | 2 | 3-5 |
| b | 2 | 3-5 |
| c | 1 | 4 |
| d | 2 | 3-5 |
| e | 2 | 3-4 |
| f | 2 | 4-5 |
| g | 2 | 3-5 |
| h | 2 | 5-5 |
| h | 2 | 4-5 |
| k | 2 | 5-5 |
| i | 1 | 2 |
| j | 2 | 2-4 |
| l | 1 | 5 |
| m | 1 | 6 |
| m | 2 | 5-6 |
| n | 1 | 4 |
| n | 2 | 4-5 |
| o | 1 | 3 |
| p | 2 | 3-5 |
| q | 2 | 3-5 |
| r | 2 | 4-5 |
| s | 1 | 14 |
| t | 2 | 1-5 |
| v | 1 | 4 |
| u | 2 | 4-5 |
| v | 1 | 5 |
| z | 1 | 9 |
| x | 2 | 2-2 |
| y | 2 | 2-2 |
| w | 1 | 10 |

Fig. 10

| | | |
|---|---|---|
| A | 2 | 1-5 |
| B | 2 | 2-6 |
| C | 1 | 4 |
| C | 1 | 12 |
| D | 2 | 2-4 |
| E | 2 | 1-12 |
| F | 2 | 1-5 |
| G | 2 | 4-5 |
| H | 2 | 1-8 |
| K | 2 | 2-5 |
| I | 1 | 2 |
| J | 2 | 2-4 |
| L | 1 | 5 |
| M | 2 | 5-5 |
| M | 1 | 10 |
| N | 1 | 9 |
| O | 1 | 3 |
| P | 2 | 2-4 |
| R | 2 | 11-13 |
| S | 1 | 14 |
| T | 2 | 1-2 |
| Q | 2 | 2-3 |
| U | 1 | 4 |
| U | 1 | 12 |
| V | 1 | 5 |
| Z | 1 | 9 |
| X | 2 | 2-2 |
| Y | 2 | 2-5 |
| W | 1 | 10 |

INVENTOR
ENZO ASCOLI
BY Emery L. Groff Jr.
Atty

INVENTOR
ENZO ASCOLI
BY Emery L. Groff Jr.
Atty

United States Patent Office 3,182,126

Patented May 4, 1965

3,182,126

ARRANGEMENT FOR PRODUCING ELECTRIC SIGNALS CONTROLLING THE TYPING OF TYPE-WRITER SIGNS DEFINED BY COORDINATES

Enzo Ascoli, Lausanne, Vaud, Switzerland, assignor to Paillard S.A., Sainte-Croix, Vaud, Switzerland, a corporation of Switzerland Filed July 17, 1961, Ser. No. 124,631

Claims priority, application Switzerland, Aug. 10, 1960, 9,085/60

6 Claims. (Cl. 178—30)

Typewriters typing signs defined by coordinates are well known, wherein each component of a letter, digit or the like sign to be typed is defined by the values of its coordinates $x$ and $y$, while a parameter $z$ defines the beginning and the end of an elementary outline. In such typewriters, the succession of values to be assumed by $x$, $y$ and $z$ defines the shape of the outline, together with the law according to which said outline is marked in time by the marking member, of whatever type the latter may be.

Many types of marking members have already been proposed with a view to reproducing the modifications in the electric values corresponding to the variations prescribed for $x$, $y$ and $z$; in all cases, it is necessary to resort to a so-called memory or storing means adapted to supply electric signals of a suitable value for each component of each letter, digit or sign to be reproduced by the marking member, after amplification if required.

It has also been proposed to resort to an optical memory and the possibility of a magnetic recording has also been disclosed. It is obvious that a multiplicity of kinds of memories or storing means may be considered and, as a matter of fact, a large number of such kinds of memories of the magnetic record or drum and strip or of the tore-shaped type are well-known in the art and have been executed on a commercial scale, chiefly for ordinators.

All known memories or storing means fall into two categories, to wit, that including at least one rotary or translational moving support and the so-called static memories. The former, of the record, strip and drum types, have an answering speed which is lower, for a capacity of information of equal value, than the second static memories of the tore-shaped type, which, in contradistinction, include a larger number of elements and require a very intricate electronic equipment and are consequently comparatively expensive. In contradistinction, the answering speed of a non-static memory may be increased by multiplying the number of tracks and reading means, but such an arrangement would lead rapidly to an increase in price, matching the cost price of static memories.

It is clearly apparent that for the purpose considered, to wit: a memory for a typewriter of the coordinate type, the following considerations lead to practical difficulties which cannot be overcome easily when using the known extant memories:

The capacity of the memory should include a curve of voltages, vs. time for the coordinates of each component of each small or capital letter, digit and symbol provided on a normal keyboard, to wit $3\times90=270$ curves approximately, each curve carrying several hundred binary information values providing the desired definition.

The answering speed for the obtention of any group of three coordinate curves corresponding to the letter selected should be such that the sum of the inquiry time, of the answering time or typing time and of the idle periods does not rise above $\frac{1}{25}$ of a second.

The arrangement should have a reduced bulk, a low cost price and its operation should show a maximum reliability consistent with normal service of the typewriter.

It has already been proposed, for instance in the United

States Patent 2,766,444 and in the German application published under Number 1,036,401, to form electric components for the typing of digits from 0 to 9 by means of a generator supplying in a continuous manner electric wave trains of different shapes and frequencies, while means are provided for selecting the trains of waves which are required for typing a given digit.

The present invention has for its object an arrangement for supplying electric signals controlling a typewriter operating through coordinates wherein a marking member is energized by at least two electric signals corresponding to the components along two axes of coordinates of the movement to be executed for typing any of the signs, small or capital letters, or digits forming part of the usual composition of a typewriter keyboard, said arrangement including an electric generator supplying in a continuous manner a number of wave trains of a given period and of different shapes and frequencies, and also means selecting for each of the signs to be typed, the waves required for supplying the electric components energizing the marking member, so as to type the desired sign. The novelty of the invention resides in that the electric generator produces the following series of waves: sinusoidal waves of simple, double and treble frequencies, rectified sinusoidal waves of simple and double frequencies, triangular waves of simple, double, treble and quadruple frequencies, clipped triangular waves of simple and double frequencies and rectangular waves of simple frequency.

By resorting to said waves as such or by adding two or more of them together, or else, by shifting their relative phases, it is possible to obtain the desired electric signals, which allows forming all the usual signs provided by a typewriter keyboard, as will be disclosed hereinafter with further detail. It should be remarked that a triangular wave is obtained by rectifying the alternations of a triangular wave of a frequency equal to half the desired frequency.

The accompanying drawings illustrate, by way of example, an embodiment of the invention and include explanatory diagrams. In said drawings:

FIG. 8 is a further chart illustrating the digits from 0 to 9 and showing which are the basic outlines to be used for forming such digits.

FIGS. 9 to 11 are further charts similar to that illustrated in FIG. 8 and relating respectively to small letters, capital letters and different conventional signs forming part of the composition of a conventional typewriter keyboard.

Figure 1:
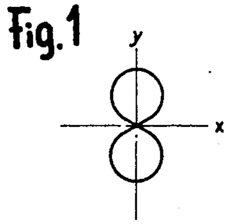
FIG. 1 shows a basic outline.
Figure 2:
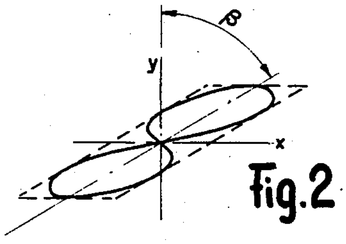
FIGS. 2 to 6 show various modifications which may be brought to said outline.
Figure 3:
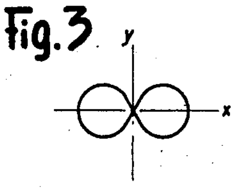
Figure 4:
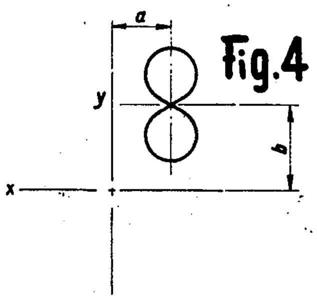
Figure 5:
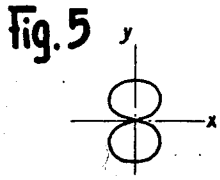
Figure 6:
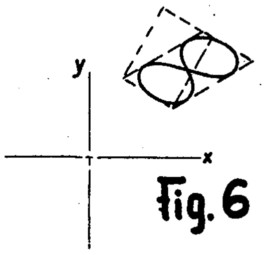

It will be first shown that any line may be shifted translationally, arranged slopingly, shifted angularly, extended in any direction and by any value, without any modification of the basic functions $x=f(t)$ and $y=f(t)$ supplied by the memory and by simple electric means.

Assuming $v_x=f_x(t)$ and $v_y=f_y(t)$ are the voltages supplied by the memory and $x=f_x(t)$ and $y=f_y(t)$ are the coordinates which are to be provided for the outlines to be marked.

Assuming, as a matter of fact, that the response of the marking member is a linear response, if the voltages supplied by the memory are applied directly to the marking member, the following equalities will be obtained at every moment: $x=Kv_x$ and $y=Kv_y$, K being the response factor of the tracing member in mm. per volt for instance, which factor depends on the structure of the marking member and defines its sensitivity for sake of simplicity, it will be assumed the sensitivities in the directions $x$ and $y$ are identical.

In other words, both functions of voltage vs. time being supplied by the memory, there corresponds directly to each function an outline formed by the tracing member. Such a basic outline may be modified as follows:

(1) *Translational shifting*

After plotting any outline with reference to a system of rectangular axes $x$ and $y$, the outline may be shifted by an amount $a$ along the axis O$x$ and by an amount $b$ along the axis O$y$ by laying down:

$$a=KV_x—b=KV_y$$

$V_x$ and $V_y$ being constant biasing voltages to be added to the variable voltages $v_x$ and $v_y$ respectively, while K is the response factor already referred to:

(2) *Slope adjustment*

The system of rectangular axes O$x$ and O$y$ which defines the outline to be marked may be transformed into an oblique system, the new axis O$x'$ forming an angle $\alpha$ with the axis O$x$, while the new axis O$y'$ forms an angle $\beta$ with O$y$; assuming:

$$tg\ \alpha=K_1 \qquad tg\ \beta=K_2$$

and $$x'=x+K_2y=K(v_x+K_2v_y)$$

$$y'=y+K_1x=K(v_y+K_1v_x)$$

In other words, there is added to the voltage of each component the voltage of the other component multiplied by a constant factor of amplification equal to the tangent of the desired slope angle.

(3) *Angular shifting*

The system of reference axes $x$ and $y$ is subjected to a rotation by an angle $\gamma$; assuming:

$$x'=x\cos\gamma—y\sin\gamma=K(v_x\cos\gamma-v_y\sin\gamma)=K(Av_x—Bv_y)$$

$$y'=x\sin\gamma+y\cos\gamma=K(v_x\sin\gamma+v_y\cos\gamma)=K(Bv_x+Av_y)$$

In other words, this consists in subtracting or adding each component to the other after multiplication or amplification by constant factors. In particular, a rotation by 90° is obtained by substituitng $x$ for $y$ and reversely.

(4) *Expansion and contraction*

A given outline may be enlarged or reduced as a whole to provide a geometrical similitude or other in a single direction, or else, differently according to the direction considered. To this end, it is sufficient to multiply or to amplify the component or components ($v_x$ $v_y$) by the selected factor or factors of amplification.

(5)

The four transformation methods referred to may be applied simultaneously or separately for a given outline which may, for instance, be translationally shifted, arranged slopingly, angularly shifted and enlarged simultaneously, as shown, for instance, in FIG. 1.

The execution of each component of any desired outline by means of periodical waves suggests immediately the idea of developing the formulae as Fourier series; it is however easy to understand and to find graphically, for instance, that the obtention of a component of any outline by means of sinusoids of a suitable frequency, amplitude and phase, leads to the necessity of superposing several ten harmonics, provided the faithfulness of the outline obtained with reference to the theoretical line corresponds to the minimum aesthetic requirements for the appearance of the final sign.

The fact that the number of periodical waves required in accordance with the present invention is limited, is due to the following facts:

The selected waves are not exclusively sinusoidal but their shape (whether triangular, sinusoidal, rectified, clipped or rectangular) is selected out of the various shapes which may be obtained by simple and known methods, with a view to reaching the best results;

The five above-mentioned possibilities of transformation which correspond also to simple well-known means increase considerably the possibilities of obtaining the desired outlines;

The capital and small letters, the digits and various signs forming normally part of a typewriter keyboard may, in practice, always be decomposed into a few elements of simple geometrical lines (such as a segment of a straight line, an arc of a circle, an arc of a sinusoid, and the like), or else, of lines obtained therethrough through the above-mentioned transformations, such as an arc of an ellipse and the like;

If an element of a particular sign requires the composition of periodical waves in a manner such that their number and shape make the static method economically objectionable, the registration in a memory record of the element considered may allow obtaining an outline of any shape whatever. However, the analysis of all the outlines required for the composition of a normal keyboard such as that illustrated in FIGS. 8 to 11, shows that this possibility need not be resorted to, and that it forms only an exceptional procedure.

Figure 7:
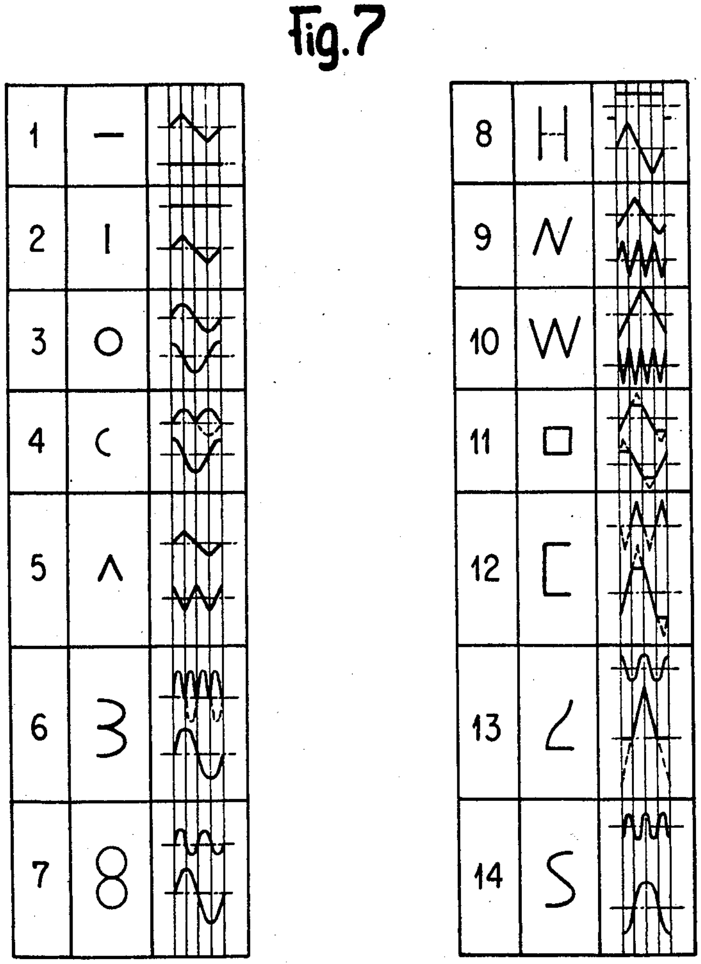
FIG. 7 is a chart showing fourteen basic outlines obtained through different combinations of wave trains.

The chart according to FIG. 7 shows fourteen different outlines in the second column, while the first column carries the reference numbers of said outlines. The third column of the chart shows the shape of the components along the axes O$x$ and O$y$, which are required for obtaining the corresponding outline. In this third column, and for each outline, the component along the axis O$x$ is illustrated above the component along the axis O$y$.

Number 1 outline is obtained by a triangular wave of a frequency $f$ for the $x$ component and by the absence of any component $y$.

Number 2 outline is obtained by the absence of a component $x$ and a triangular wave of a frequency $f$ for the component $y$.

Number 3 outline is a circle obtained by components $x$ and $y$ which are both sinusoidal and of a frequency $f$, one of the waves being phase-shifted by 90° with reference to the other.

Number 4 outline is a half-circle obtained by a rectified sinusoidal component $x$ of a frequency $f$ and by a sinusoidal component $y$ of a frequency $f$, the two components being phase-shifted by 90° with reference to one another.

Number 5 outline is obtained by a triangular component $x$ of a frequency $f$ and by a triangular component $x$ of a frequency $2f$.

Number 6 outline is obtained by a rectified sinusoidal component $x$ of a frequency $2f$ and by a sinusoidal component $y$ of a frequency $f$.

Number 7 outline is obtained by a sinusoidal component $x$ of a frequency 2 and by a sinusoidal component $y$ of a frequency $f$.

Number 8 outline is obtained by a rectangular component $x$ of a frequency $f$ and by a component $y$ which is triangular and of a frequency $2f$.

Number 9 outline is obtained by a triangular component $x$ of a frequency $f$ and by a triangular component $y$ of a component of a frequency $3f$.

Number 10 outline is obtained by a triangular component $x$ of a frequency $f$ and by a triangular component $y$ of a frequency $4f$.

Number 11 outline is obtained by two clipped triangular components $x$ and $y$ of a frequency $f$ which are phase-shifted with reference to each other by 90°.

Number 12 outline is obtained by a clipped triangular component *x*, the frequency of which is 2*f* and by a clipped triangular component *y*, the frequency of which is *f*.

Number 13 outline is obtained by a sinusoidal component of a frequency 2*f* and by a clipped triangular component *y*, the frequency of which is *f*.

Number 14 outline is obtained by a sinusoidal component *x* of a frequency 3*f* and by a sinusoidal component *y* of a frequency *f*.

The charts of FIGS. 8 to 11 show various signs, digits and letters of a typewriter keyboard and their shape, as shown in the first column, are those which may be obtained through the combinations of the outlines scheduled in the third column. The second column shows simply the number of different outlines which are required for typing the corresponding sign. Certain digits and letters are shown twice in succession, when their shape may be modified by a different selection of the basic outlines used. Thus, in FIG. 8, for instance, it is possible to obtain two different shapes for the digits 1, 3, 7 and 8.

Figure 12:
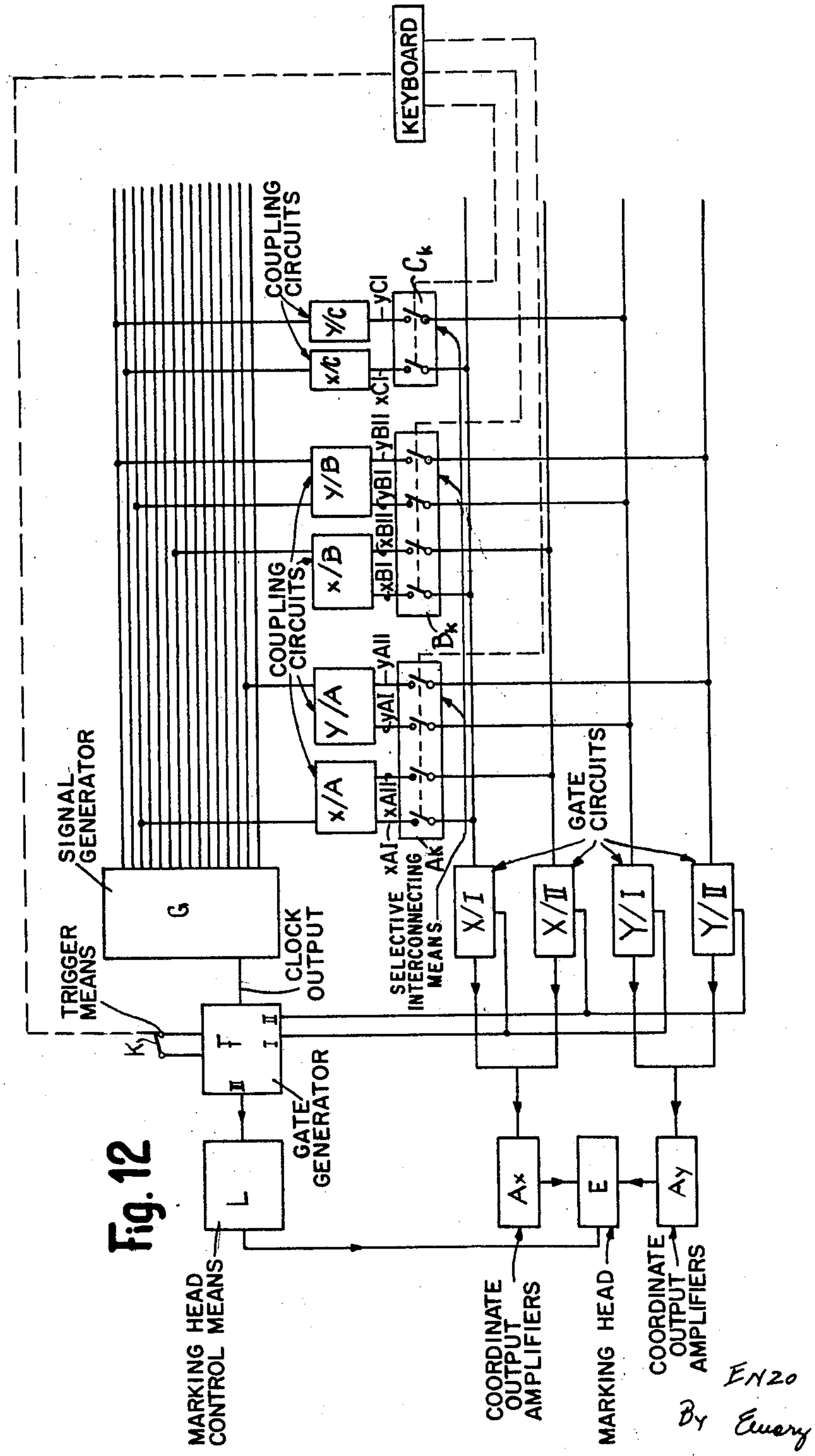
FIG. 12 is a diagram of the arrangement according to the invention.

FIG. 12 is a block diagram of an arrangement which allows typing all the symbols illustrated in FIGS. 8 to 11.

An electric generator G, fed by a supply of energy which is not illustrated, for instance by the mains, continuously produces the periodical electric waves referred to in the chart of FIG. 7 and which are required for the execution of the fourteen outlines illustrated in said FIG. 7. In addition to the twelve waves of the different shapes which have been mentioned at the beginning of the description, the generator is adapted to feed three continuous supplementary outputs which supply a clipped triangular wave, the frequency of which is *f* and which is phase-shifted by 90°, a triangular wave of a frequency 2*f* which is also phase-shifted by 90° and a sinusoidal wave of a frequency *f* which is phase-shifted by 90°.

The arrangement includes means allowing the selection, for each symbol, letter or digit to be typed, of the wave or waves required for the formation of electric signals corresponding to the components of the movements to be executed for the obtention of said symbol. Said means include coupling circuits, of which only some have been illustrated and which are designated respectively by *x*/A, *y*/A, *x*/B, *y*/B, *x*/C and *y*/C. The coupling circuit *x*/A is connected with that output of the generator G which is adapted to supply the *x* components required to generate the letter A, while the coupling circuit *y*/A supplies the required components *y* for the same letter A. The arrangement includes, of course, a coupling circuit for each *x* and *y* component of each symbol which is to be typed by the typewriter. However, such circuits are generally very simple and are reduced generally to a direct connection, or else, they include sometimes an unvarying voltage divider of the resistance type which allows matching the amplitude of the periodic selected waves with the value which is required for obtaining a correct marking of the typed outline.

Each of the coupling circuits *x*/A and *y*/A, for example, is provided with two outputs designated, respectively, by *x*/AI and *x*AII and *y*AI and *y*AII and which are adapted each to supply respectively the first and the second of the components required for generating the letter A. All said outputs are connected with a quadruple gang switch $A_k$ which is closed, for instance by means of a suitable keyboard key, when the letter A is to be generated.

The coupling circuits *x*/B and *y*/B are similarly connected with a quadruple gang switch B/*k*, because the generation of the letter B also requires the marking of two components or characteristic forms in succession.

In contradistinction, the letter C may be generated through a single component along the X axis and a single component along the Y axis, so that the circuits *x*/C and *y*/C each have only one output *x*CI and *y*CI, respectively, the two circuits being connected with a double gang switch $C_k$ controlled, similarly to the switches $A_k$ and $B_k$, by a key on the keyboard (not shown) of the machine. All the outputs *x*AI, *x*BI, *x*CI, etc., of the circuits providing the components *x* of the signs to be typed by the machine are connected with a first gate circuit X/I and the outputs XAII, XBII, etc. of the circuits having such a second output are connected with a second gate circuit X/II. Similarly, the outputs YAI, etc. and YAII, etc. of the circuits supplying the components *y* are all connected, respectively, with two gate circuits Y/I and Y/II.

Said gate circuits X/I, X/II, Y/I and Y/II allow sending electric signals respectively into a first output amplifier $A_x$ for amplification of the horizontal component and into a second output amplifier $A_y$ for amplification of the vertical component of each sign, said two amplifiers energizing a typing or marking head designed generally by the reference E. A suitable marking head is fully disclosed in Belgian Patent No. 577,784, as well as in U.S. Patent 1,715,781 to Pein, FIGURES 7, 13 and 15, issued June 4, 1929.

The four above-mentioned gate circuits X/I, X/II, Y/I, Y/II are each adapted to allow the passage of the selected wave to the proper output amplifier A*x* or A*y* during one period of the fundamental wave. To this end, said gate circuits may, for instance, be constituted merely by a transistor and controlled by a gating signal generator F which emits gating signals to the said gate circuits defining the moment and the duration of the signal gating cycle of each of said gate circuits. Said gating signal generator F is fed by a sinusoidal clock wave emitted by the generator G, which clock wave serves for ensuring the synchronized gating of the said gate circuits. Furthermore, said gating generator F is connected with a control switch K, common to all of the keys on the keyboard (not shown) of the writing machine, which closes each time any key of the keyboard is lowered. When the control switch K is closed, the gating signal generator F is triggered and supplies via a first output I, a gating pulse to the two gating circuits X/I and Y/I during one period of the sinusoidal wave of a frequency *f*, said pulse being followed immediately, via a second output II, by a second gating pulse directed to the gating circuits X/II and Y/II during a following period. Furthermore, the gating signal generator F is provided with an output III feeding a head controller L adapted to control the operative and inoperative condition of the marking or typing head E. In the case, for example, where the marking head E is provided with a tracing stylus, the signal supplied by the controller L produces a shifting of said stylus in a direction *z* perpendicular to the components *x* and *y*, so as to bring the stylus into engagement with the sheet (not shown) on which the typing is to be performed and to shift it away from said sheet when the typing of a sign or portion of a sign is finished.

When the typing of a sign is executed by means of a jet of ink which is deflected electrically, the controller L may supply a voltage for accelerating said jet of ink, or else, for locking it against motion.

The various circuit sections mentioned with reference to FIG. 12 all belong to well-known electronic technique and do not form per se an element of the invention, so that they need not be illustrated with further detail.

Obviously, it is possible to bring various modifications to the embodiment described and, in particular, certain of the periodical waves which are used may be formed in those selecting and transforming circuits which are to supply such waves. Thus, the clipped triangular waves may be obtained starting from a corresponding triangular wave supplied by the generator G, the coupling circuit which is to supply said clipped wave including consequently means for clipping the original triangular wave.

I claim:

1. In a writing machine operating in accordance with a two coordinate system, to produce symbols from characteristic form combinations, and including a suitable keyboard means and coordinate controlled marking head therein; the combination of a signal generator having a plurality of signal outputs adapted to continuously emit a like plurality of preselected output waveforms at said outputs and a clock wave output, a gating signal generator synchronized with said signal generator by said clock wave output and including a second plurality of signal outputs, a plurality of gate circuits having input, output and gate terminals connected by the said gate terminals with selected ones of said second plurality of signal outputs, said plurality of gate circuits including gates representative of each coordinate in said two coordinate system, coupling circuit means for each of the signal outputs and respective preselected output waveforms of said signal generator, selective interconnecting means operated by said keyboard means for selectively interconnecting said coupling circuit means to said input terminals of said gate circuits in response to actuation of said keyboard means, and first and second coordinate output amplifiers, responsive to the respective coordinate outputs from said representative gate circuits, connected between said output terminals of said gate circuits and said marking head.

2. The invention defined in claim 1, wherein said plurality of output waveforms comprises sinusoidal waves of basic, double and treble frequencies, rectified sinusoidal waves of basic and double frequencies, triangular waves of basic, double, treble and quadruple frequencies, clipped triangular waves of basic and double frequencies and rectangular waves of basic frequency.

3. The invention defined in claim 2, wherein said waveforms further include sinusoidal waves of basic frequency phase-shifted by 90° with reference to the first-mentioned sinusoidal waves, clipped triangular waves of basic frequency phase-shifted by 90° with reference to said first-mentioned clipped waves, and triangular waves of double frequency phase-shifted by 90° with reference to the first-mentioned triangular waves of double frequency.

4. The invention defined in claim 1, wherein said combination further includes a marking head control means for placing said marking head in alternately operative and inoperative conditions, said control means being connected between said marking head and one of said plurality of signal outputs on said gating signal generator, whereby said head is synchronized with said gating circuits.

5. The invention defined in claim 1, wherein said combination further includes trigger means for said gating signal generator operated by said keyboard means commonly actuated by said keyboard means with said selective interconnecting means.

6. The invention defined in claim 5, wherein said combination further includes a marking head control means for placing said marking head in alternately operative and inoperative conditions, said control means being connected between said marking head and one of said plurality of signal outputs on said gating signal generator, whereby said head is synchronized with said gating circuits.

References Cited by the Examiner

UNITED STATES PATENTS

| | | | |
|---|---|---|---|
| Re. 23,713 | 9/53 | Hunt | 178—30 |
| 1,715,781 | 6/29 | Pein | 33—23 |
| 2,402,989 | 7/46 | Dickinson | 235—61 |
| 2,406,880 | 9/46 | Young | 178—18 |
| 2,766,444 | 6/56 | Sheftelman | 340—318 |
| 2,989,702 | 6/61 | White | 340—324.1 |

NEIL C. READ, *Primary Examiner.*

ROBERT A. LEIGHEY, WALTER L. LYNDE, *Examiners.*